United States Patent
Morrish

(10) Patent No.: US 7,158,139 B1
(45) Date of Patent: Jan. 2, 2007

(54) SIMPLE ON SCREEN DISPLAY SYSTEM USING MAPPED ROM GENERATED CHARACTERS

(75) Inventor: Andy Morrish, Saratoga, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/907,736

(22) Filed: Jul. 17, 2001

(51) Int. Cl.
*G06T 11/00* (2006.01)
*G06F 13/00* (2006.01)

(52) U.S. Cl. ..................... 345/467; 345/536
(58) Field of Classification Search ............ 345/536, 345/545, 98, 467
See application file for complete search history.

(56) References Cited

U.S. PATENT DOCUMENTS

| | | | | |
|---|---|---|---|---|
| 5,486,842 A * | 1/1996 | Kim | ............................ | 345/26 |
| 5,917,468 A * | 6/1999 | Han | ............................ | 345/581 |
| 5,969,727 A * | 10/1999 | Kaneko | ....................... | 345/536 |
| 6,034,673 A * | 3/2000 | Kim | ............................ | 345/551 |
| 6,181,353 B1 * | 1/2001 | Kurisu | ........................ | 345/537 |
| 6,195,078 B1 * | 2/2001 | Dinwiddie et al. | ......... | 345/636 |
| 6,198,468 B1 * | 3/2001 | Cho | ............................ | 345/467 |
| 6,219,072 B1 * | 4/2001 | Tanaka et al. | ............... | 345/531 |
| 6,281,876 B1 * | 8/2001 | Jones, Jr. | ..................... | 345/467 |
| 6,310,657 B1 * | 10/2001 | Chauvel et al. | ............. | 348/569 |
| 6,324,695 B1 * | 11/2001 | Lee et al. | ...................... | 725/38 |
| 6,351,292 B1 * | 2/2002 | Knox et al. | .................. | 348/569 |
| 6,400,377 B1 * | 6/2002 | Hiraka et al. | ............... | 345/716 |
| 6,462,746 B1 * | 10/2002 | Min et al. | .................... | 345/545 |
| 6,480,238 B1 * | 11/2002 | Knox et al. | .................. | 348/569 |

\* cited by examiner

*Primary Examiner*—Kee M. Tung
*Assistant Examiner*—Jin-Cheng Wang
(74) *Attorney, Agent, or Firm*—Merchant & Gould P.C.; Timothy P. Sullivan

(57) ABSTRACT

The present invention provides a low cost OSD system with minimal ROM requirements, minimal computing power required from the microcontroller, and minimal I/O port requirements. The OSD system creates a fixed frame around a small set of programmable characters. The small set of programmable characters is used to create an icon within the OSD display. The icon is selected by sending minimal information to the microcontroller. In one particular example, four bits of information are sent to the microcontroller to select one of the available sixteen different icons. The OSD frame characters and OSD programmable area icon characters are stored in ROM and no RAM is used. The OSD silicon die size is reduced as compared to a traditional OSD silicon die size.

20 Claims, 14 Drawing Sheets

| 6BIT ADDRESS COL ROW $BA_{5-3}\ BA_{2-0}$ | 5BIT MAPPED ADDRESS | BLANK OSD | ICON ENABLE | IMAGE ROW | IMAGE COL |
|---|---|---|---|---|---|
| 000 000 | 00000 | 0 | 0 | 0 | 0 |
| 000 001 | 00001 | 0 | 0 | 0 | 1 |
| 000 010 | 00010 | 0 | 0 | 0 | 2 |
| 000 011 | 00011 | 0 | 0 | 0 | 3 |
| 000 100 | 00100 | 0 | 0 | 0 | 4 |
| 000 101 | 00101 | 0 | 0 | 0 | 5 |
| 000 110 | XXXXX | 1 | 0 | | |
| 000 111 | XXXXX | 1 | 0 | | |
| 001 000 | 01000 | 0 | 0 | 1 | 0 |
| 001 001 | 0XXXX | 0 | 1 | 1 | 1 |
| 001 010 | 0XXXX | 0 | 1 | 1 | 2 |
| 001 011 | 0XXXX | 0 | 1 | 1 | 3 |
| 001 100 | 01100 | 0 | 0 | 1 | 4 |
| 001 101 | 01101 | 0 | 0 | 1 | 5 |
| 001 110 | XXXXX | 1 | 0 | | |
| 001 111 | XXXXX | 1 | 0 | | |
| 010 000 | 10000 | 0 | 0 | 2 | 0 |
| 010 001 | 1XXXX | 0 | 1 | 2 | 1 |
| 010 010 | 1XXXX | 0 | 1 | 2 | 2 |
| 010 011 | 1XXXX | 0 | 1 | 2 | 3 |
| 010 100 | 10100 | 0 | 0 | 2 | 4 |
| 010 101 | 10101 | 0 | 0 | 2 | 5 |
| 010 110 | XXXXX | 1 | 0 | | |
| 010 111 | XXXXX | 1 | 0 | | |
| 011 000 | 11000 | 0 | 0 | 3 | 0 |
| 011 001 | 11001 | 0 | 0 | 3 | 1 |
| 011 010 | 11010 | 0 | 0 | 3 | 2 |
| 011 011 | 11011 | 0 | 0 | 3 | 3 |
| 011 100 | 11100 | 0 | 0 | 3 | 4 |
| 011 101 | 11101 | 0 | 0 | 3 | 5 |
| 011 110 | XXXXX | 1 | 0 | | |
| 011 111 | XXXXX | 1 | 0 | | |
| 100 000 | 01010 | 0 | 0 | 4 | 0 |
| 100 001 | 01011 | 0 | 0 | 4 | 1 |
| 100 010 | 01110 | 0 | 0 | 4 | 2 |
| 100 011 | 01111 | 0 | 0 | 4 | 3 |
| 100 100 | 11110 | 0 | 0 | 4 | 4 |
| 100 101 | 11111 | 0 | 0 | 4 | 5 |
| 100 110 | XXXXX | 1 | XXX | | |
| 100 111 | XXXXX | 1 | XXX | | |
| 101 000 | XXXXX | 1 | XXX | | |
| : : | XXXXX | 1 | XXX | | |
| : : | XXXXX | 1 | XXX | | |
| 111 111 | XXXXX | 1 | XXX | | |

X = DON'T CARE

*Fig.4*

| DESCRIPTION | | 7 BIT ADDR RANGE | PA[6:5] | PA[4] | PA[3:0] |
|---|---|---|---|---|---|
| FRAME | | 0000000 : 0011111 | 00 : 00 | 0 : 1 | 0000 : 1111 |
| CHAR 1 | ICON 0 : ICON 15 | 0100000 : 0101111 | 01 : 01 | 0 : 0 | 0000 : 1111 |
| CHAR 4 | ICON 0 : ICON 15 | 0110000 : 0111111 | 01 : 01 | 1 : 1 | 0000 : 1111 |
| CHAR 2 | ICON 0 : ICON 15 | 1000000 : 1001111 | 10 : 10 | 0 : 0 | 0000 : 1111 |
| CHAR 5 | ICON 0 : ICON 15 | 1010000 : 1011111 | 10 : 10 | 1 : 1 | 0000 : 1111 |
| CHAR 3 | ICON 0 : ICON 15 | 1100000 : 1101111 | 11 : 11 | 0 : 0 | 0000 : 1111 |
| CHAR 6 | ICON 0 : ICON 15 | 1110000 : 1111111 | 11 : 11 | 1 : 1 | 0000 : 1111 |

*Fig.10*

SIMPLE ON SCREEN DISPLAY SYSTEM USING MAPPED ROM GENERATED CHARACTERS

FIELD OF THE INVENTION

The present invention is related to electronics, and more specifically to electronic circuits for on screen displays.

BACKGROUND OF THE INVENTION

Many computers, televisions, and other equipment use on screen displays (OSDs) to display and adjust parameters related to the equipment. For example, OSDs may visually represent the level of volume, contrast, brightness, vertical position, horizontal position, and the like. While the user is adjusting the parameter, the OSD provides visual feedback to the user relating to the adjustment they are performing.

Existing OSD devices, however, are expensive and put a heavy load on the microcontroller. OSDs typically contain two major elements. The first element is an area of ROM to store bit map arrays of characters or icons that will be displayed on the screen. Each character array (typically 18 pixels high by 12 pixels deep) is given a code (e.g. 0–255), which can be used as part of the addressing system to identify the bit map in ROM.

The second element is an area of RAM (Page RAM), to define the appearance of the displayed 'page' or image on the screen. The Page RAM contains lists of character codes that define which character will be displayed at each location.

The microcontroller stores the page definition character code listings for each page, requiring a custom mask microcontroller, and significant microcontroller ROM (typically 2–4 Kbytes) adding the cost of the micro controller.

The microcontroller is programmed to display the OSD, and update the display when certain actions are taken, such as when user controls are activated. This involves a large firmware overhead, which requires more ROM to store, and a faster, higher power microcontroller to generate and manage the OSD images and user interface.

Lower end displays typically do not implement an OSD, but instead rely upon a number of front panel controls to manage the user interface. One of the front panel controls is a button array system and another is a button plus LED system.

In the button array system type of display, the user has an array of buttons with a printed icon illustrating the function of the button. Many buttons are required to adjust the various parameters and so typically, a membrane type switch panel is used so that multiple switches can be accommodated in an array in one assembly. The microcontroller must periodically scan the array for any button being pressed, and then interpret that into a function command to change the desired function (e.g. contrast or picture size). The switch membrane is expensive, and the number of buttons that can be scanned is limited by the number of available ports of the micro controller, which is again, a function of microcontroller cost.

In the button plus LED system type of display a small number of buttons, are used for a function select (normally two buttons) and a small number of buttons are used for a function adjust (normally two buttons). According to this system, the user receives a low level of visual feedback of the selected function by LEDs visible through holes in the front bezel adjacent to printed or embossed icons. As the buttons are pressed, each LED is illuminated in turn to show which function is selected. This system requires many LED's and a microcontroller port to drive each LED. In addition, the bezel of the device is custom molded, which is a time consuming and expensive limitation.

What is needed is a low cost OSD system that can be placed within devices that normally would not have implemented an OSD due to cost limitations.

SUMMARY OF THE INVENTION

The present invention is directed to providing a low cost OSD system with minimal ROM requirements, minimal computing power required from the microcontroller, and minimal I/O port requirements. Briefly described, the OSD system creates a fixed frame around a small set of programmable characters that may be chosen to create an icon within the OSD.

According to one aspect of the invention, the characters for the OSD are stored in ROM. As the system is drawing the display the characters are taken directly from the ROM.

According to another aspect of the invention, an OSD display is created by sending minimal information to the microcontroller. In one particular example, only four bits of information are sent to the microcontroller. The four bits are used to select one of sixteen available icons for display.

According to yet another aspect of the invention, a fixed sized frame for the OSD is used. The fixed sized frame includes a small number of locations that may be changed to display icon representations.

According to yet another aspect of the invention, the OSD silicon die size is reduced as compared to a traditional OSD silicon die size. ROM requirements are reduced as no OSD pages or firmware routines are stored in the ROM. There is also no RAM requirements to store programmable page information for the OSD. This represents a considerable die size saving compared to a conventional OSD, where typically page definition requires around 500–1000 bytes of RAM in the OSD, and 2–4 Kbytes of ROM in the microcontroller.

According to still yet another aspect of the invention, an address is created by the OSD system to access the appropriate character that is stored in ROM with minimal intervention. Whereas a typical OSD requires the microcontroller to define the appearance of the OSD image, the simple OSD is designed to produce a set image, with minimal external intervention.

BRIEF DESCRIPTION OF THE DRAWINGS

FIG. 4 illustrates a 6-bit to 5-bit address code mapping;

FIG. 10 illustrates an exemplary page ROM address table;

DETAILED DESCRIPTION OF THE PREFERRED EMBODIMENT

Figure 1:
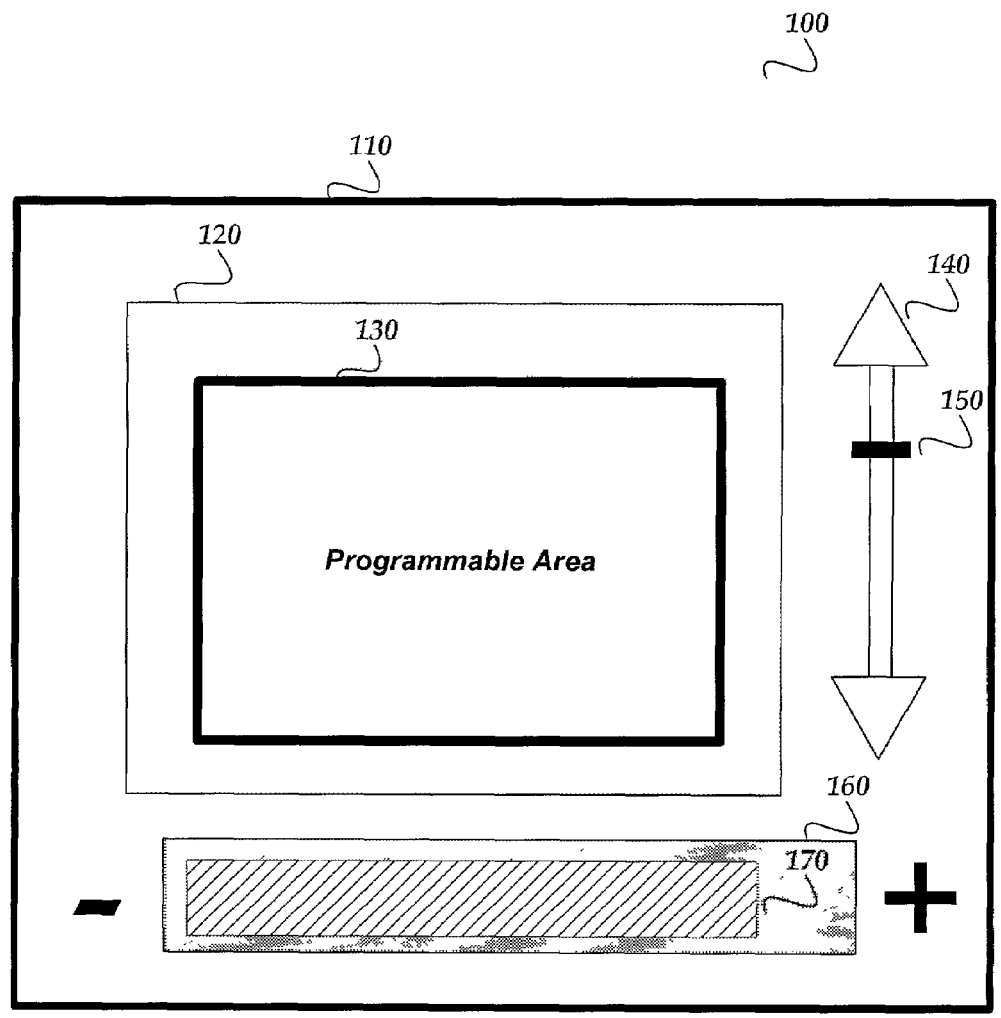
FIG. 1 shows an exemplary diagram of an OSD frame.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "connected" means a direct electrical connection between the items connected, without any intermediate devices. The term "coupled" means a direct electrical connection between the items connected, or an indirect connection through one or more passive or active intermediary devices. The term "circuit" means either a single component or a multiplicity of components, either active and/or passive, that are coupled to provide a desired function. The term "signal" means at least one current, voltage, or data signal. Referring to the drawings, like numbers indicate like parts throughout the views.

Briefly described, the present invention is directed to providing a low cost OSD system with minimal ROM requirements, minimal computing power required from the microcontroller, and minimal I/O port requirements. The OSD system creates a fixed frame around a small set of programmable characters that may be chosen to create an icon within the OSD. A four-bit code is sent to the microcontroller to select the icon to be displayed. When the OSD system reaches the programmable area, the four-bit code is used to access the characters making up the icon from ROM.

As will be appreciated in view of the present disclosure, a specific implementation is described for exemplary purposes but the concepts may be applied to similar devices having different features.

FIG. 1 shows an exemplary diagram of an OSD frame, according to one embodiment of the invention. As shown in the figure, OSD frame 100 includes frame 110, screen frame 120, programmable area 130, vertical bar 140, vertical indicator 150, horizontal bar frame 160, and horizontal bar indicator 170.

Frame 110 encloses screen frame 120, programmable screen 130, vertical bar 140, vertical indicator 150, horizontal bar frame 160, and horizontal bar indicator 170. Screen frame 120 encloses programmable area 130. Vertical indicator 150 is positioned along vertical bar 140, and horizontal bar indicator 170 is located and sized to be within horizontal bar frame 160.

According to one embodiment of the invention, OSD frame 100 is a 6×5 character matrix, is preprogrammed within the device, and is static. The OSD frame may be turned on or off by an external command from the microcontroller. Each of the characters within the OSD is an 8×8 pixel cell and may use up to four colors. For example, according to one embodiment, within a simple OSD device, OSD frame 100 appears as shown in the figure. As OSD frame 10 is preprogrammed, the microcontroller stores and sends only minimal information at power up regarding the size and position of simple OSD frame 100 on the displayed screen, and is thereafter simply turned on or off by writing to one register. According to another embodiment, the OSD frame may be dynamic and change based on the parameter being adjusted.

The simple OSD frame shows the user basic views of the functions that are the subject of the interface. According to the present example, which is designed for computer display applications, OSD frame 100 gives the user the appearance of a computer screen. As will be appreciated, many other OSD frames may be designed. For example, the OSD frame may give the appearance of a phone, a television, or any other device consistent with the application. Within screen frame 120 is programmable area 130. Programmable area 130 allows substitution of up to six different characters and may be used to display an icon. Other sizes may be chosen for programmable area 130. According to one embodiment, up to sixteen different icons may be displayed within the OSD system (See FIG. 14 for representative icons) to provide the user with information about the selected OSD function. In this way, the same basic information that may be presented through a conventional non-OSD approach, where the same basic icons may have either been printed or embossed on the bezel of the device, may be shown in the OSD. The icons may be chosen in many different ways. For example, a bit code may be sent to the OSD that maps the appropriate icons into programmable area 130 without external intervention by the microcontroller.

As will be appreciated in view of the present disclosure, the size, shape, and color of the frame and the icon space may be different between applications, but the same general concept may be applied as in the present example, which is described herein only as an illustration of the invention.

Figure 2:
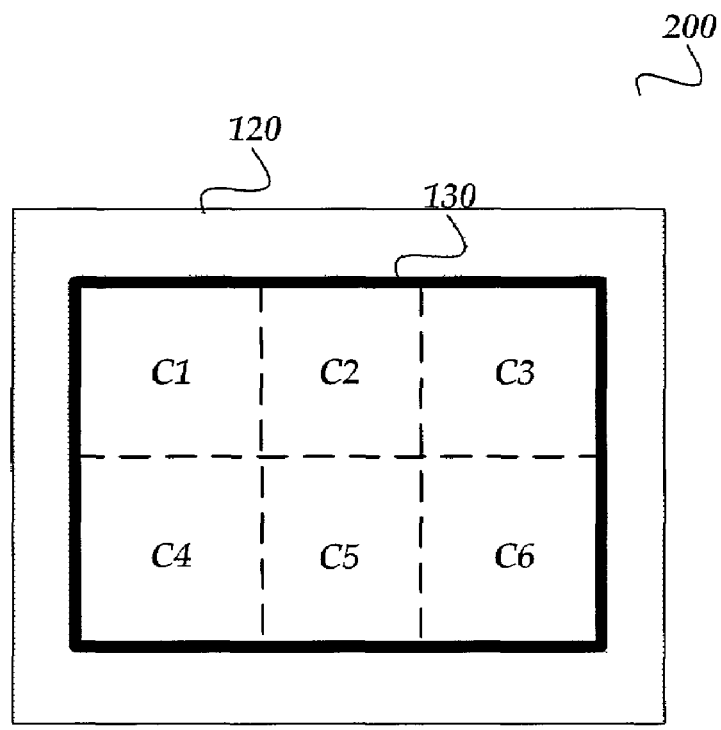
FIG. 2 illustrates a programmable area within an OSD frame.

FIG. 2 illustrates a programmable area within an OSD frame, according to an embodiment of the invention. As shown in the figure, frame 120 contains programmable area 130 that includes six character locations (C1–C6).

Within programmable area 130, six characters may be placed at locations C1–C6, allowing different icons to be formed representing the adjustment being carried out. For example, characters C1–C6 may be chosen to create one of the animation sequences illustrated in FIG. 14.

Each character within programmable area can display up to four colors. These four colors are independent of the colors chosen for another character within programmable area 130. As will be appreciated, more or less colors may be displayed within a single character depending on the specific hardware used. According to one embodiment of the invention, characters C1–C6 create ⅙ of the displayed icon. The characters making up the frame of the OSD, as discussed above, are static, according to one embodiment of the invention.

The icon is selected by sending a 4-bit code to the microcontroller within the OSD system. The OSD system then maps the appropriate 6 characters forming the selected icon into programmable area 130 without external intervention by the microcontroller.

Figure 3:
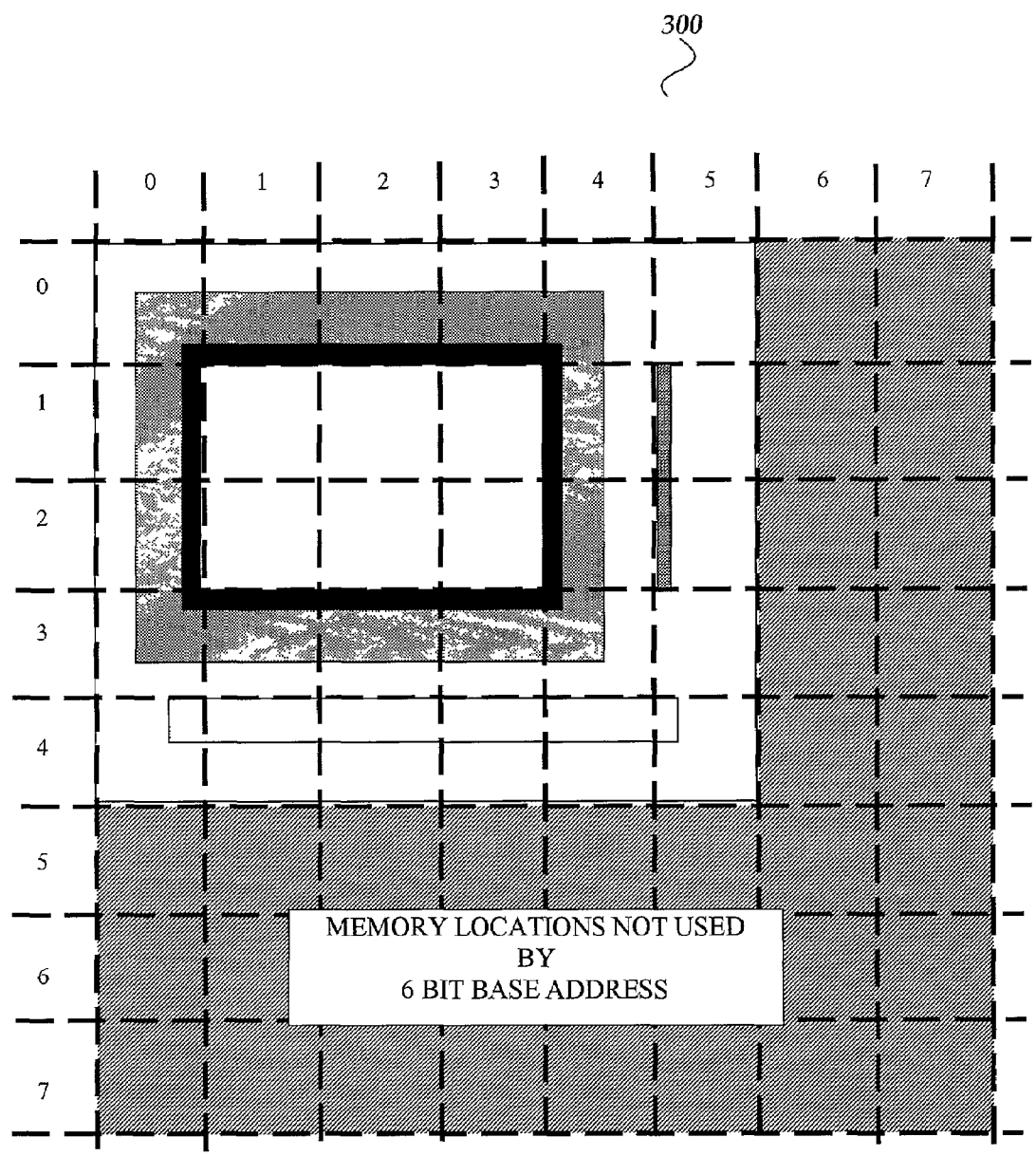
FIG. 3 shows thirty characters of an OSD frame in an 8×8 address grid.

FIG. 3 shows thirty characters of an OSD frame in an 8×8 address grid, according to one embodiment of the invention. As shown in the figure, OSD frame 300 is composed of a 6×5 character matrix of 8×8 pixel characters. The OSD frame comprises characters at grid address locations (0,0), (0,1), (0,2), (0,3), (0,4), (0,5), (1,0), (1,4), (1,5), (2,1), (2,4), (2,5), (3,0), (3,1), (3,2), (3,3), (3,4), (3,5), (4,0), (4,1), (4,2), (4,3), (4,4), and (4,5). The programmable area comprises characters at the six grid address locations (1,1), (1,2), (1,3), (2,1), (2,2) and (2,3). The characters within the OSD frame and the programmable area are stored in ROM minimizing die size. As will be appreciated in view of the present disclosure, the characters may be stored in some other memory within the OSD system.

As the OSD frame lies within an 8×8 address grid, a base address can be easily constructed using a six bit base address using two 3-bit counters, one for the x axis and one for the y axis. According to one embodiment of the invention, for efficiency, the 30 locations making up the OSD frame and programmable area are mapped into the 32 memory locations provided by using a five bit address code. This allows a 5-bit address to be used instead of a six-bit address.

FIG. 4 illustrates a 6-bit to 5-bit address code mapping, according to one embodiment of the invention. As shown in the figure, 6 to 5 bit address code mapping 400 is a table having columns for 6BIT ADDRESS, 5BIT MAPPED ADDRESS, BLANK OSD, ICON ENABLE, IMAGE ROW, and IMAGE COL and 64 rows.

ICON ENABLE is signal that is a logical high "1" when the address corresponds to one of the six character locations within the programmable area. More specifically, when the address is at 6BIT ADDRESS locations 001001, 001010, 001011, 01001, 010010, and 01011 that correspond to 5BIT MAPPED ADDRESS locations 01001, 01010, 01011, 10001, 10010, and 10011, the ICON ENABLE is set to high.

The OSD is set to BLANK OSD when the six-bit address is outside of the 30 characters forming the OSD frame and programmable area. IMAGE ROW and IMAGE COL identify the row and column of the character in decimal format. For example, the first character of the OSD frame is located at IMAGE ROW 0 and IMAGE COL 0. The logic to perform the mapping from the 6BIT ADDRESS to the 5BIT MAPPED ADDRESS is described below.

Figure 5:
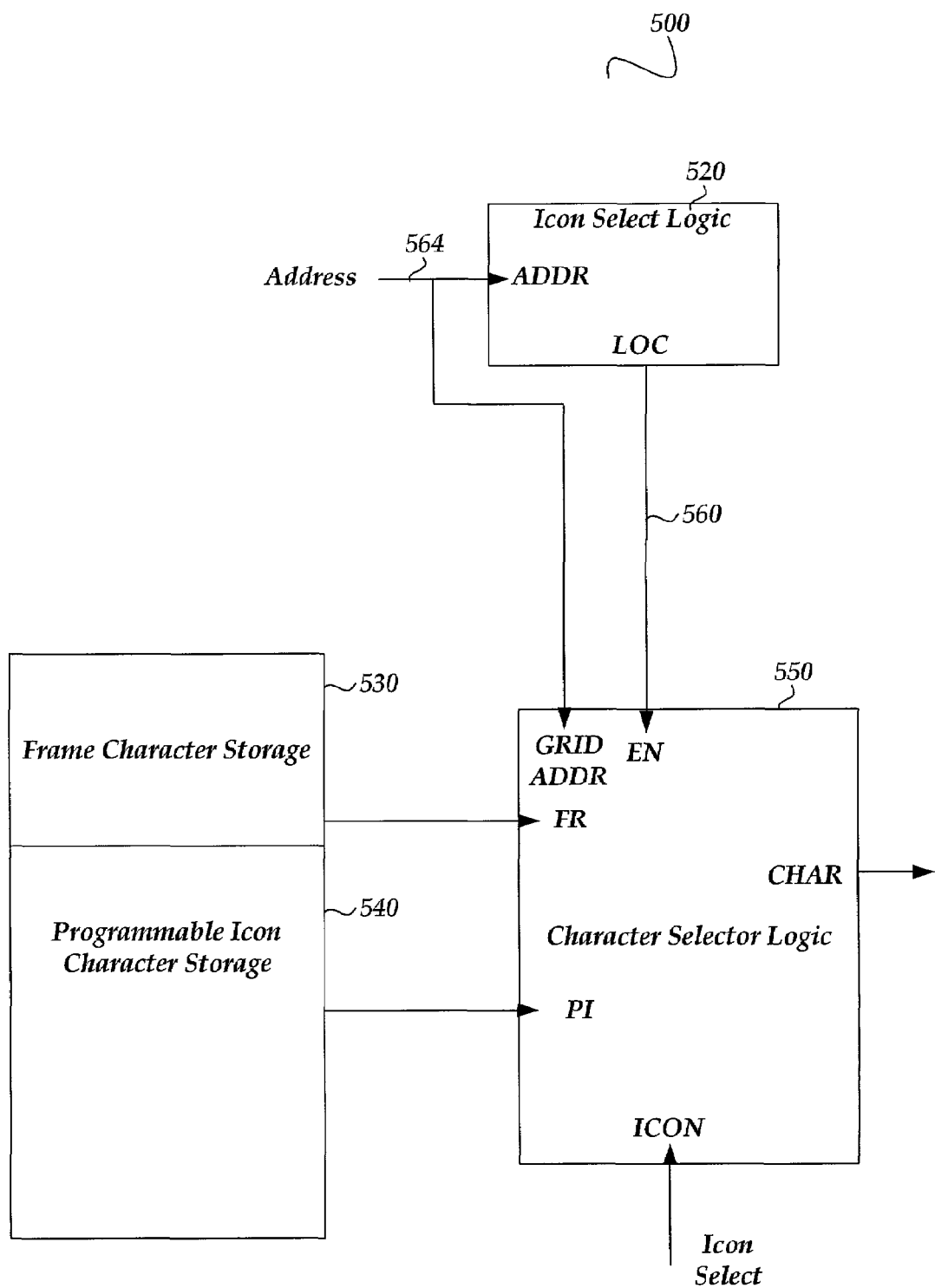
FIG. 5 shows an overview schematic diagram of a simple OSD system.

FIG. 5 shows an overview schematic diagram of a simple OSD system, according to one embodiment of the invention. As shown in the figure, simple OSD system 500 includes icon select logic 520, frame character storage 530, programmable icon character storage 540, and character selector 550.

Icon select logic 520 has an input ADDR coupled to node 564 and an output LOC coupled to node 560. Character selector logic 550 has an input EN coupled to node 560, an input FR coupled to frame character storage 530, an input PI coupled to programmable icon character storage 540, an input ICON coupled to an icon select signal, an input GRIDADDR coupled to node 564, and an output CHAR. An address signal is coupled to node 564.

Icon select logic 520 is arranged to receive an address signal and determine when the address being drawn by OSD system 500 is located within the programmable area of the OSD. When the address is within the programmable area, icon select logic 520 produces an icon enable signal at node 560 indicating that the address is within the programmable area. In response to the icon enable signal, the icon select signal, and the address signal; character selector logic 550 selects an icon from programmable icon character storage 540. The icon select signal indicates the icon to be displayed within the OSD image. The icon may be selected from a predetermined number of stored icons within the OSD. According to one embodiment of the invention, the icon select signal is a 4-bit value representing one of sixteen icons that may be displayed within the OSD image. As will be appreciated, more or less icons may be stored within the OSD system. When the icon enable signal indicates that the address is not within the programmable area, character selector logic 550 in response to the address signal selects the appropriate frame character for the OSD frame from frame character storage 530. The appropriate character is based on the address grid location within the OSD. For example, if the OSD is at address grid location (1,1) the character used to represent the OSD frame at this location (1,1) is retrieved from frame character storage 530. The character selected from frame character storage 530 or programmable icon character storage 540 is output through the CHAR output of character selector logic 550 and is drawn to the display.

Figure 6:
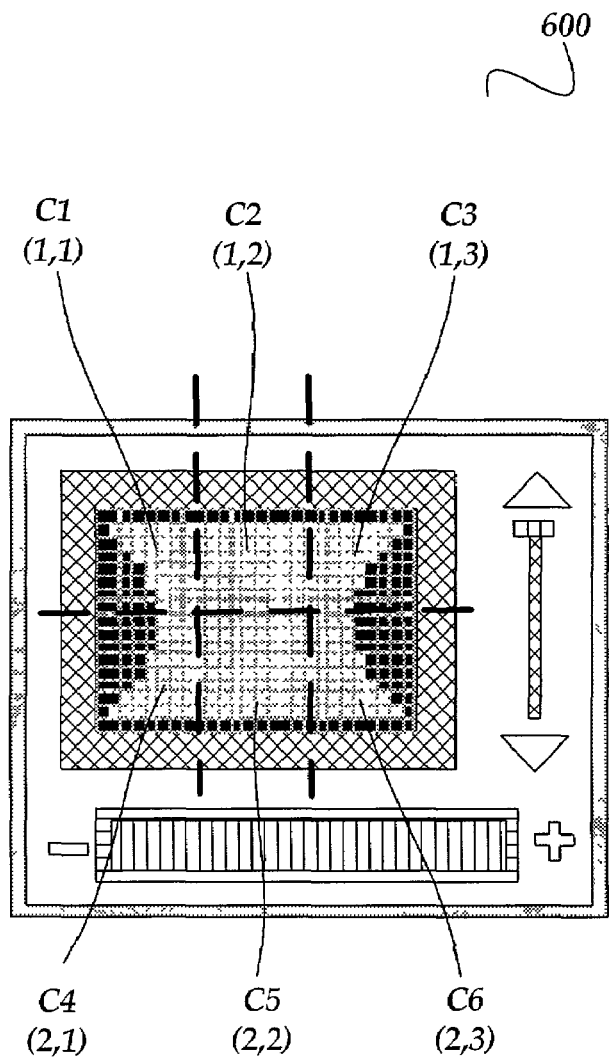
FIG. 6 illustrates six characters combined to create an icon.

FIG. 6 illustrates six characters combined to create an icon, according to one embodiment of the invention. As shown in the figure icon 600 includes characters C1 to C6 at locations (1,1), (1,2), (1,3), (2,1), (2,2), and (2,3), respectively. While the icon is made up of six different characters according to this particular example, more or less characters may be used to create the icon. For example, the programmable area could contain space for eight or sixteen characters to make up the icon.

Figure 7:
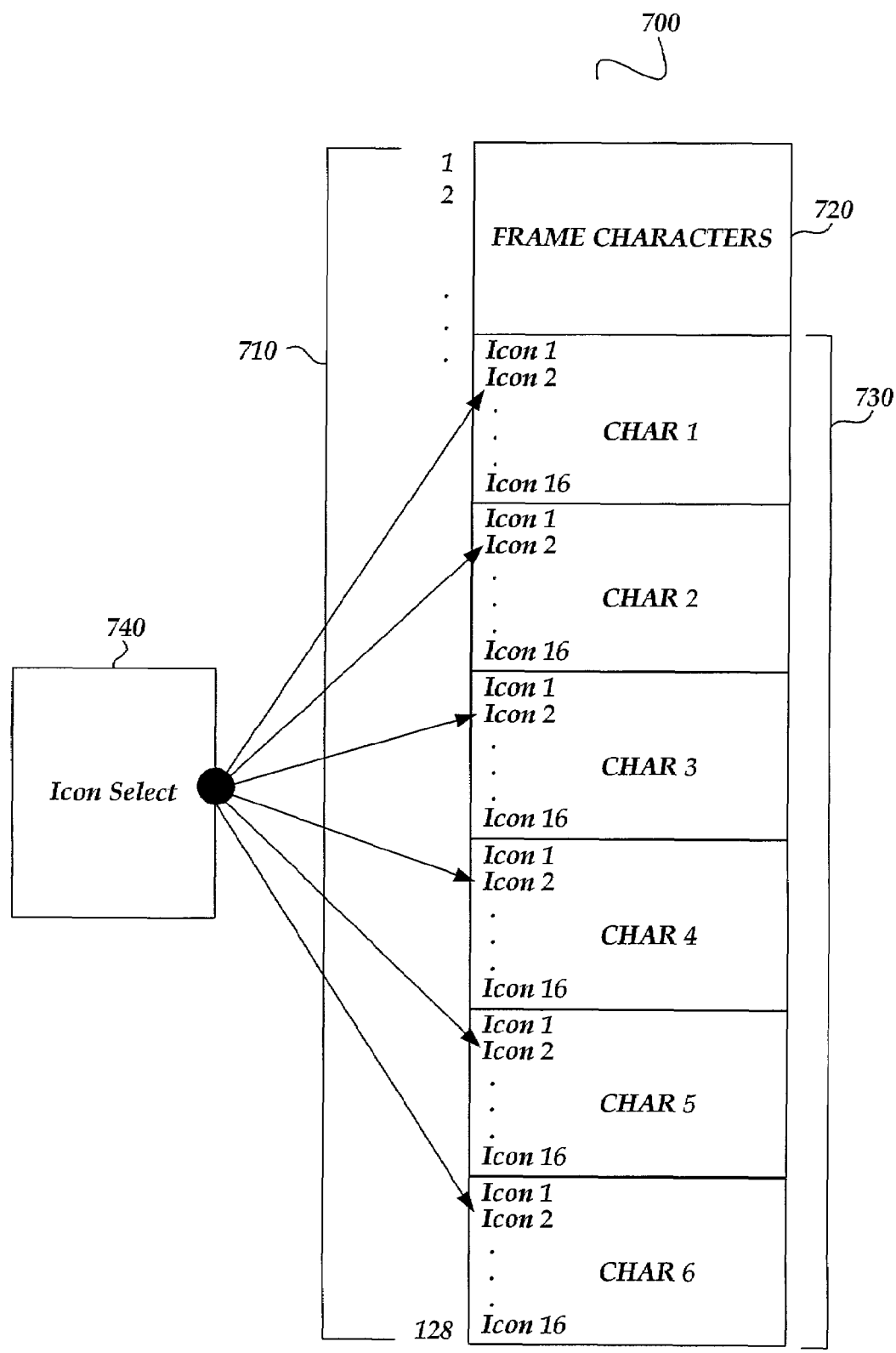
FIG. 7 illustrates an icon selection system for an OSD system.

FIG. 7 illustrates an icon selection system for an OSD system, according to one embodiment of the invention. As shown in the figure, icon selection system 700 includes icon select 740, character memory 710, frame character storage 720, and icon character storage 730.

Character memory 710 is sized to hold the characters used for the OSD frame and the icon characters used within the programmable area of the OSD. According to one embodiment of the invention, character memory 710 is a ROM that has 128 character addresses that each store an 8×8 character cell. Frame character storage 720 is sized to hold the 30 characters used for the OSD frame. Icon character storage 730 includes space for displaying one of the sixteen icons in each of the six characters within the programmable area. For example, CHAR 1 is the character located at address grid location (1,1) and stores a separate character for each of the sixteen icons. According to the particular embodiment described, CHAR 1 stores the characters making up the upper left ⅙ of the icons (See FIG. 6).

As shown in the figure, icon select 740 is selecting to display Icon 2 within the programmable area. Each character location stores a character making up a portion of the icon. For example, the Icon 2 character stored in each of CHAR1 through CHAR 6 could make up the icon as displayed in FIG. 6. A single value representing the desired icon may therefore be used to select an icon character to be displayed within the programmable area of the OSD. As will be appreciated, more or less icons may be used within the system.

The use of a fixed sized frame for the OSD with only a small number of characters changed to give icon representation results in the complete OSD page definition for sixteen different icons mapped into a memory space of just 128 locations. This represents a considerable die size saving compared to a conventional OSD, where typically page definition requires around 500–1000 bytes of RAM in the OSD, and 2–4 Kbytes of ROM in the microcontroller.

Figure 8:
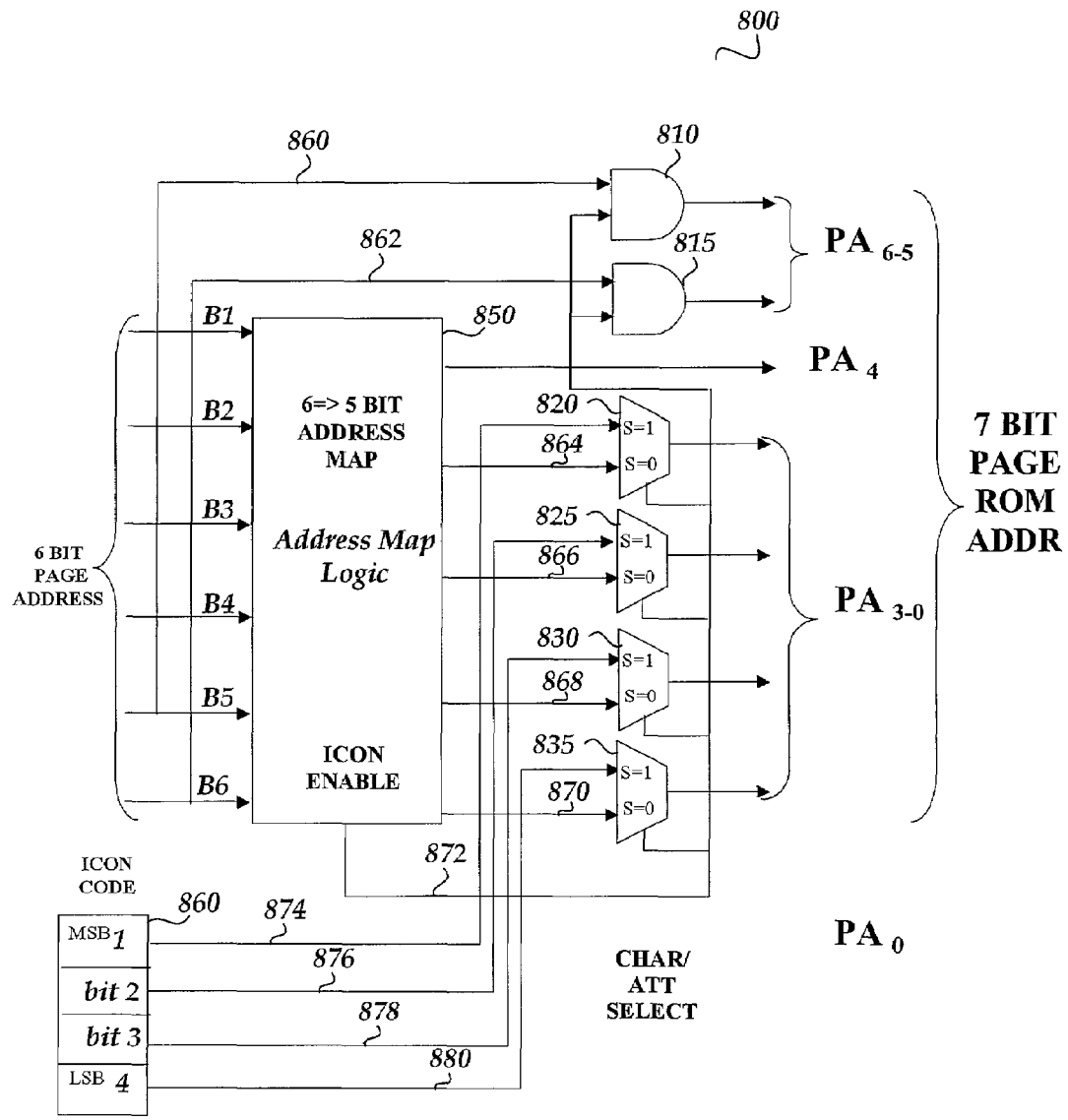
FIG. 8 illustrates an address translation system for the OSD system.

FIG. 8 illustrates an address translation system for the OSD system according to one embodiment of the invention. As shown in the figure, address translation system 800 includes AND gates 810 and 815, selectors 820, 825, 830, and 835, address map logic 850, and icon code storage 860.

Address map logic 850 includes six inputs for receiving six address bits (B1–B6), an icon enable output coupled to node 872, an output coupled to PA$_4$, an output coupled to node 864, an output coupled to node 866, an output coupled to node 868, and an output coupled to node 870. Selector 820 has a select input coupled to node 872, an input coupled to node 874, an input coupled to node 864, and an output coupled to PA$_3$. Selector 825 has a select input coupled to node 872, an input coupled to node 876, an input coupled to node 866, and an output coupled to PA$_2$. Selector 830 has a select input coupled to node 872, an input coupled to node 878, an input coupled to node 868, and an output coupled to PA$_1$. Selector 835 has a select input coupled to node 872, an input coupled to node 880, an input coupled to node 870, and an output coupled to PA$_0$. AND gate 810 has an input coupled to node 860 and an input coupled to node 872. AND gate 815 has an input coupled to node 862 and an input coupled to node 872. Icon code storage 860 has a MSB output coupled to node 874, a bit 2 output coupled to node 876, a bit 3 output coupled to node 878, and a LSB output coupled to node 880. B6 is coupled to node 862 and B5 is coupled to node 860. B1–B6 are coupled to the six bit page address.

The operation of address translation system 800 will now be described. Address map logic 850 receives a six-bit address signal and maps the incoming six-bit address to a five-bit address. Address map logic 850 also determines when the incoming address is located within the programmable area of the OSD. When the address is located within the programmable area, address map logic 850 produces a logical high ("1") icon enable signal at node 872. In response to the high icon enable signal produced at node 872, selectors 820, 825, 830, and 835 select and output the address bits provided by icon code storage 860. When the icon enable signal is a logical low ("0"), selectors 820, 825, 830, and 835 select and output the mapped lower four-bits of the five-bit address produced by address map logic 850. As will be appreciated, the icon signal could be any value so long as there is a measurable difference in the signal between when the address is within the programmable area and when it is not within the programmable area. AND gate 810 is arranged to output a logical high signal when the icon enable signal and node 860 is a logical high. AND gate 815 is arranged to output a logical high signal when the icon enable signal and node 862 is high. AND gate 810 and AND gate 815 produce the seventh bit (PA$_6$) and the sixth bit (PA$_5$) of a seven bit address. The seven bit address created by combining the address bits output from selectors 820, 825, 830, and 835 and AND gates 810 and 815 address the appropriate character within the ROM (See FIG. 7 and related discussion). As will be appreciated in view of the present disclosure, when there are more or less icons and characters used within the OSD system the addressing system may change. This may cause the seven bit address to change to an eight bit, six bit, five bit, or some other address to access the appropriate character.

Figure 9:
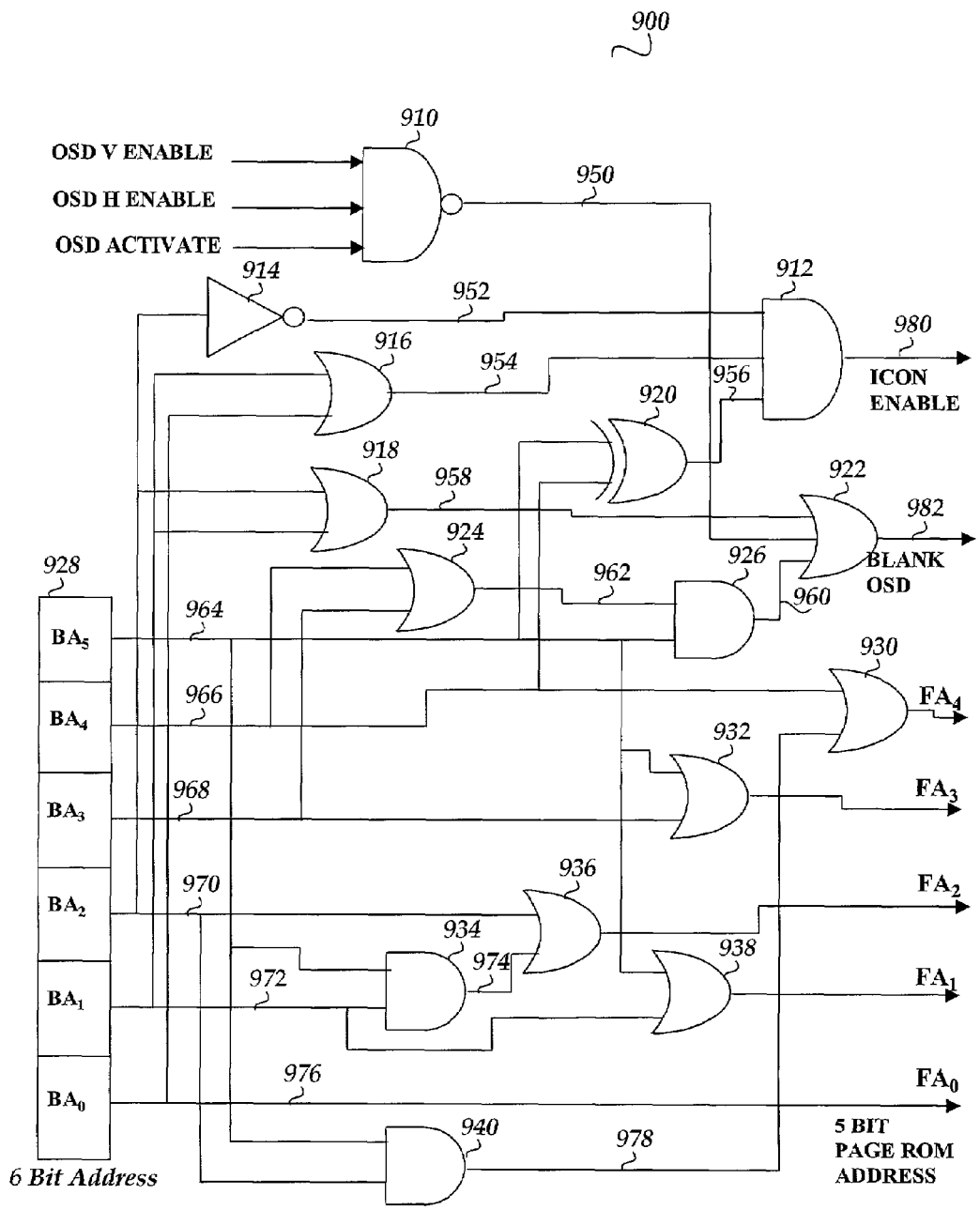
FIG. 9 shows an exemplary schematic diagram of a six-bit to five-bit frame address mapping logic.

FIG. 9 shows an exemplary schematic diagram of a six-bit to five-bit frame address mapping logic, according to one embodiment of the invention. As shown in the figure, six-bit to five-bit frame address mapping logic 900 includes 6 bit address 928, AND gates 912, 926, 934, and 940, NOT gate 914, NAND gate 910, XOR gate 920, and OR gates 916, 918, 922, 924, 930, 932, 936, and 938. The logic shown is for one specific exemplary example. It will be appreciated by those of ordinary skill in view of the present disclosure that the logic shown may be changed based on the specific implementation.

NAND gate 910 has an input coupled to an OSD V enable signal, an input coupled to an OSD H enable signal, an input coupled to an OSD activate signal and an output coupled to node 950. AND gate 912 has an input coupled to node 952, an input coupled to node 954, an input coupled to node 956, and an output coupled to node 980. OR gate 922 has an input coupled to node 958, an input coupled to node 950, an input coupled to node 960 and an output coupled to node 982. XOR gate 920 has an input coupled to node 964, an input coupled to node 966, and an output coupled to node 956. AND gate 926 has an input coupled to node 962, an input coupled to node 964, and an output coupled to node 960. OR gate 930 has an input coupled to node 966, an input coupled to node 978 and an output coupled to FA4. OR gate 932 has an input coupled to node 964, an input coupled to node 968, and an output coupled to FA3. OR gate 936 has an input coupled to node 970, an input coupled to node 974, and an output coupled to FA2. OR gate 938 has an input coupled to node 964, an input coupled to node 972, and an output coupled to FA1. FA0 is coupled to node 976. NOT gate 914 has an input coupled to node 970 and an output coupled to node 952. OR gate 916 has an input coupled to node 972, an input coupled to node 976, and an output coupled to node 954. OR gate 918 has an input coupled to node 970, an input coupled to node 972, and an output coupled to node 958. OR gate 924 has an input coupled to node 966, an input coupled to node 968, and an output coupled to node 962. AND gate 934 has an input coupled to node 964, an input coupled to node 972, and an output coupled to node 974. AND gate 940 has an input coupled to node 964, an input coupled to node 970, and an output coupled to node 978. BA$_5$ is coupled to node 964. BA$_4$ is coupled to node 966. BA$_3$ is coupled to node 968. BA$_2$ is coupled to node 970. BA$_1$ is coupled to node 972. BA$_0$ is coupled to node 976.

The operation of the six-bit to five-bit frame address mapping logic 900, will now be described. The logic gates receive the six-bit address and map the address to a five-bit address as described above. When the address is within the programmable area, the output of AND gate 912 produces a logical high icon enable signal at node 980 indicating to the OSD system to retrieve characters from the programmable icon character storage as shown by FIG. 5. When the address is outside of the OSD frame, OR gate 922 produces a logical high signal at node 982 instructing the OSD to blank the OSD. As will be appreciated in view of the present disclosure, the logic is specific to the implementation of the OSD system and will change according to the implementation.

FIG. 10 illustrates an exemplary page ROM address table, according to one embodiment of the invention. As shown in the figure, address table 1000 includes columns for description, 7 bit address range, address bits six and five, address bit four, and address bits zero to three, and rows for the frame characters, character 1, character 2, character 3, character 4, character 5, and character 6.

Address bits zero to three range between a value of zero (0000) and sixteen (1111) the frame and each character. Address bit 4 is either 0 or 1, representing whether the character is on the top row or bottom row of the programmable area. Address bits six and five range between zero (00) and three (11). When the bits have a value of zero the character is a frame character. When the bits have a value of one, the character is the first column of characters within the programmable area. When the bits have a value of two, the character is the second column of characters within the programmable area. When the bits have a value of three, the character is the third column of characters within the programmable area. As discussed above the seven bit address range is used to access one of 128 memory locations to access a specific character.

The use of a fixed frame with only a small number of characters changed to give icon representation results in the complete OSD page definition for 16 different icons mapped into a memory space of just 128 bytes. This represents a considerable die size saving compared to a conventional OSD, where typically page definition requires around 500–1000 bytes of RAM in the OSD, and 2–4 Kbytes of ROM in the microcontroller.

Figure 11:
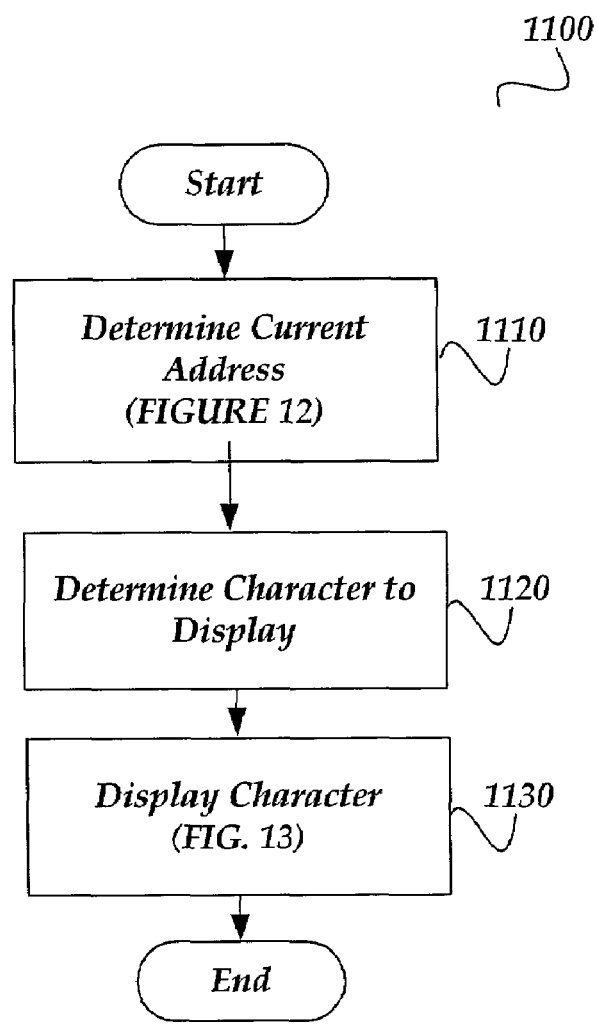
FIG. 11 shows a logical flow for an OSD system.

FIG. 11 shows a logical flow for an OSD system according to one embodiment of the invention. After a start block, the logical flow moves to a block 1110 at which point the current address for the OSD system is determined (See FIG. 12 and related discussion). The determined address indicates the position that is currently being drawn by the OSD system. For example, the address determines what character within the 6×5 OSD image is being displayed. Transitioning to block 1120, the character to display is determined. The character may be a frame character or a character making up an icon depending on the current address. The appropriate character is then displayed (See FIG. 13 and related discussion).

Figure 12:
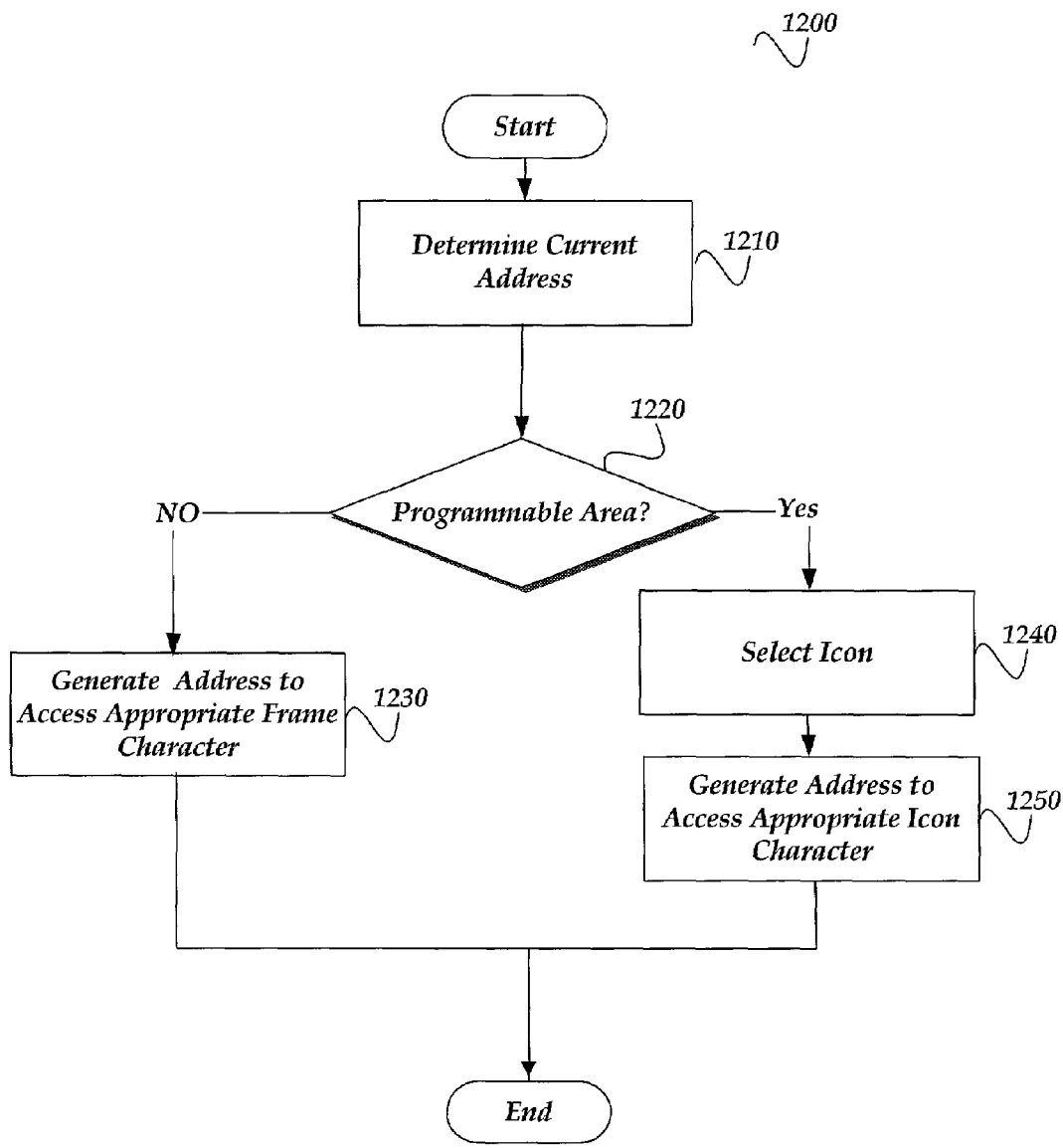
FIG. 12 illustrates a logical flow for determining the drawing location within the OSD system.

FIG. 12 illustrates a logical flow for determining the drawing location within the OSD system, according to one embodiment of the invention. After a start block, the logical flow moves to block 1210 where the logic determines the current drawing location for the OSD system. The current drawing location is monitored to determine when the drawing address for the OSD is within the frame area of the programmable area.

Transitioning to decision block 1220, a determination is made as to whether the current drawing location is within the programmable area. When the drawing location is not within the programmable area, the logic flows to block 1230. At block 1230, the address to access the appropriate frame character is generated. The generated address accesses the frame character at the current drawing address. For example, at address grid (0,0) the address representing the first frame character is generated. When the drawing location is within the programmable area, the logic flows to block 1240 to select the icon to display. According to one embodiment of the invention, the icon may be one of sixteen different icons and the icon is determined by a four-bit value representing one of the sixteen different icons. The number of icons within the system, however, may be any number of icons. Transitioning to block 1250, the address to display the appropriate icon character is generated. For example, according to the particular example described, when the address is at address grid (1,1) and the selected icon is icon 2 the address will be generated to select the second character within the first character of the programmable area (See FIG. 7 and related discussion). The logical flow then ends.

Figure 13:
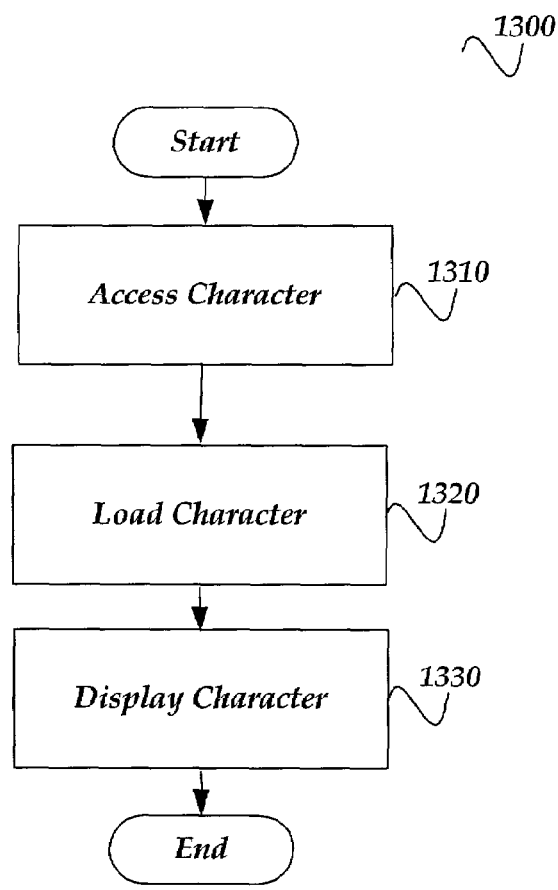
FIG. 13 illustrates a logical flow for displaying a character.

FIG. 13 illustrates a logical flow for displaying a character, according to one embodiment of the invention. After a start block, the logic flows to a block 1310 at which point the memory location for the character is accessed. According to one particular embodiment, the character may be accessed in one of 128 locations within ROM. Transitioning to block 1320, the character is loaded from the ROM. According to one embodiment, the loaded character is an 8-bit by 8-bit character. Moving to block 1330, the character is displayed by the OSD video logic.

Figure 14:
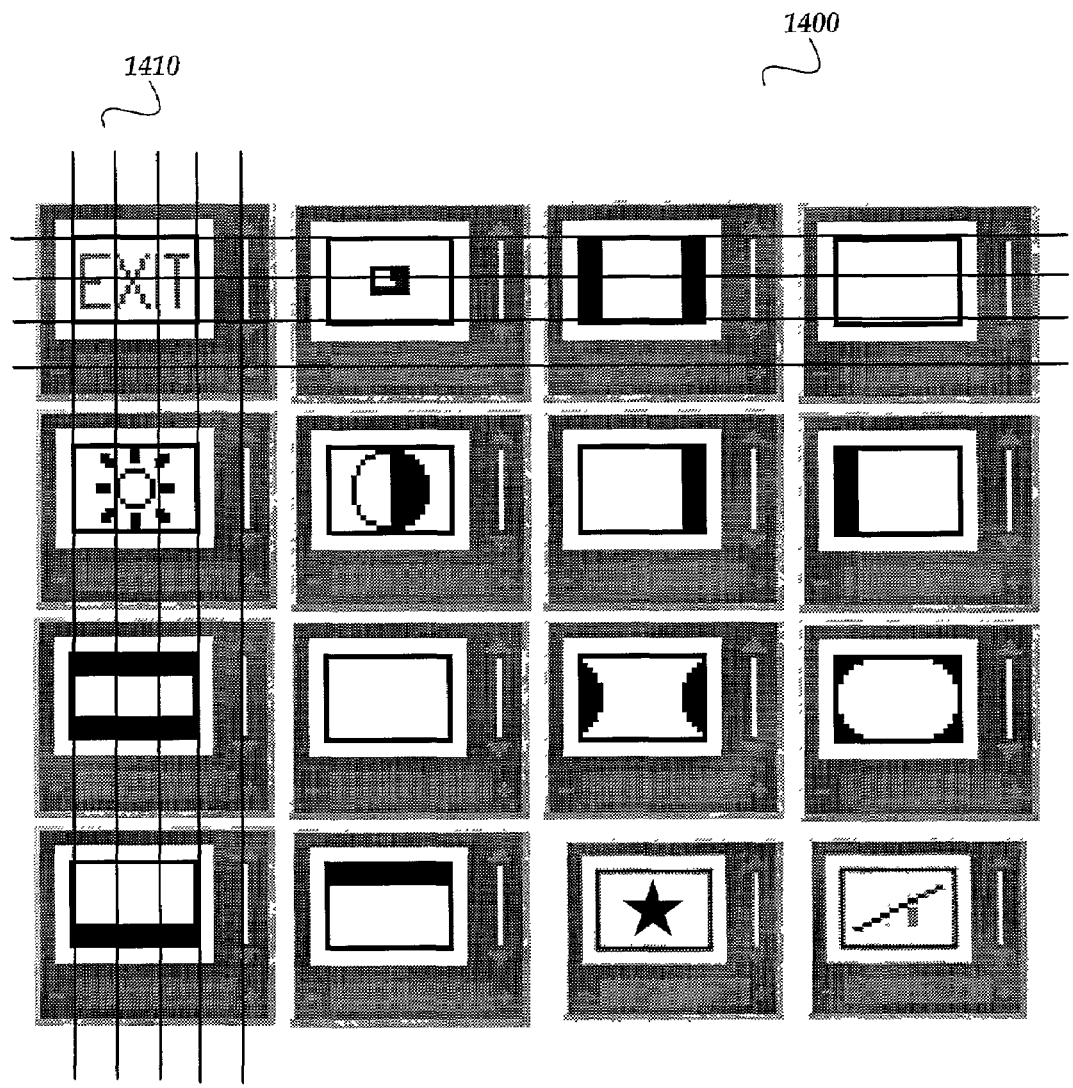
FIG. 14 shows exemplary icon; in accordance with aspects of the invention.

FIG. 14 shows exemplary icons according to one embodiment of the invention. As shown in the figure, icon 1410 has been divided into thirty character locations. The EXIT icon is segmented into six different characters and is within the programmable area contained within the OSD frame. It will be appreciated that the icons displayed are merely representative icons and other icons may be generated for each particular embodiment.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for displaying an icon for an on screen display (OSD) comprising:
   a memory having a predetermined size for storing characters, wherein the characters comprise frame characters that are used to create an OSD frame and icon characters that may be combined to create an icon; wherein the memory has an address grid that may be addressed using an n-bit address; wherein the memory does not store OSD pages and programmable page information that is associated with the OSD;
   an address mapping circuit that is configured to map each of the characters within the memory from an n-bit address to at least an (n−1) bit address such that each of the characters has an (n−1) bit address that is used to identify the character within the memory;
   an icon select logic circuit that is configured to produce an icon enable signal in response to an address signal, wherein the address signal indicates a location within the memory; and
   a character selector logic circuit that is configured to select between one of the frame characters and one of the icon characters in response to the icon enable signal, the address signal, and an icon select signal, wherein the icon character is selected from no more than thirty two icon characters and wherein the frame characters are preprogrammed.

2. The apparatus of claim 1, wherein the number of frame characters and icon characters stored within the memory do not exceed 128.

3. The apparatus of claim 2, wherein the icon select logic circuit further comprises, a logic circuit that is configured to produce the icon enable signal when the location within the address grid indicated by the address signal is one of a predetermined number of locations.

4. The apparatus of claim 3, wherein the predetermined number of locations are defined by the address grid locations used to display the icon.

5. The apparatus of claim 2, wherein the icon select signal further comprises a predetermined number of bits, the predetermined number of bits based on the predetermined number of icons that may be displayed.

6. The apparatus of claim 2, wherein the address mapping logic circuit is further configured to generate an address to access the either one of the frame characters or the one of the icon characters in response to the icon enable signal, the address signal, and the icon select signal.

7. The apparatus of claim 6, wherein the generated address uniquely identifies the selected character.

8. The apparatus of claim 1, wherein the icon select signal indicates the icon to display within the OSD frame from a predetermined number of icons.

9. The apparatus of claim 1, wherein the predetermined size of the memory is based on a number of the frame characters comprising the OSD frame and on the predetermined number of icons that may be displayed.

10. The apparatus of claim 9, wherein the number of the frame characters comprising the OSD fame is static.

11. The apparatus of claim 10, wherein the selected icon character makes up a predetermined portion of the icon.

12. A method for selecting characters to produce an on screen display (OSD) that is used to display one of a plurality of icons, comprising:
mapping each character within a memory from an n-bit address to at least an (n−1) bit address such that each of the characters has an (n−1) bit address that may be used to address the character within the memory and wherein the characters consist of frame characters that are used to create an OSD frame and icon characters that are combined to create an icon; wherein the memory does not store OSD pages and programmable page information that is associated with the OSD;
determining an address indicating a current drawing position within the OSD;
selecting from one of the frame characters to display and one of the icon characters to display based on the determined address;
loading the selected character from the memory using the (n−1) bit address mapped to the selected character; and
displaying the selected character.

13. The method of claim 12, further comprising generating an icon enable signal in response to the address.

14. The method of claim 13, wherein the number of icons that may be displayed does not exceed sixteen.

15. The method of claim 14, further comprising:
determining the one of the plurality of icons to display; and
identifying a location of the icon character that comprises a portion of the determined one of the plurality of icons to display.

16. The method of claim 15, wherein determining the one of the plurality of icons to display, further comprises receiving a value between zero and sixteen indicating the icon to select.

17. The method of claim 16, wherein the selected icon character makes up a predetermined portion of the icon when displayed.

18. The method of claim 17 further comprising, generating an address to access the frame character or the icon character.

19. The method of claim 18, wherein the generated address uniquely identifies the frame character or the icon character.

20. An apparatus for selecting characters to produce an on screen display (OSD) that includes an OSD frame that includes an icon, comprising:
a means for mapping characters within a memory from an n-bit address to at least an (n−1) bit address such that each of the characters has an (n−1) bit address that may be used to address the character within the memory and wherein the characters comprise frame characters that are used to create the OSD frame and icon characters that are used to create the icon; wherein the memory does not store OSD pages and programmable page information that is associated with the OSD;
a means for determining an address indicating a current drawing position;
a means for determining when the address is within the OSD frame;
a means for selecting an icon character comprising a portion of the icon;
a means for loading the icon character from the memory; and
a means for displaying the icon character.

* * * * *

UNITED STATES PATENT AND TRADEMARK OFFICE
CERTIFICATE OF CORRECTION

PATENT NO.         : 7,158,139 B1
APPLICATION NO.    : 09/907736
DATED              : January 2, 2007
INVENTOR(S)        : Morrish It is certified that error appears in the above-identified patent and that said Letters Patent is hereby corrected as shown below:

Col. 10, Claim 10, Ln. 67 change "fame" to --frame--.

Signed and Sealed this

Twenty-eighth Day of August, 2007

JON W. DUDAS
*Director of the United States Patent and Trademark Office*